O. H. BURDICK.
Vegetable-Cutter.
No. 214,809. Patented April 29, 1879.
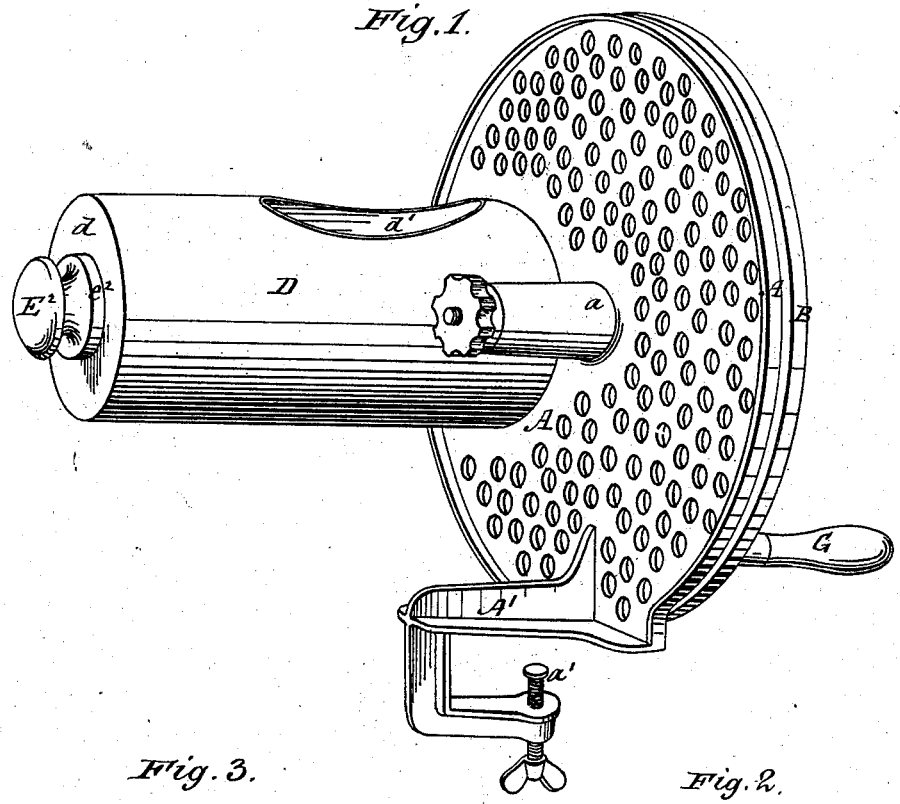
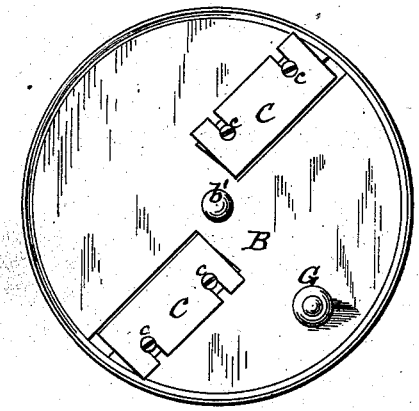
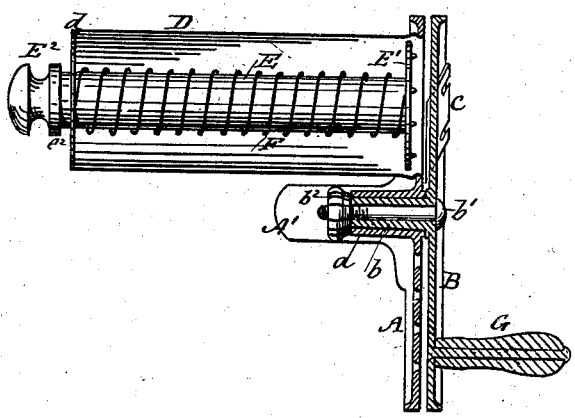
Witnesses:
W. B. Masson
W. E. Bowen
Inventor:
Orrin H. Burdick
by E. E. Masson
atty.

UNITED STATES PATENT OFFICE.

ORRIN H. BURDICK, OF AUBURN, NEW YORK.

IMPROVEMENT IN VEGETABLE-CUTTERS.

Specification forming part of Letters Patent No. 214,809, dated April 29, 1879; application filed February 13, 1879.

*To all whom it may concern:*

Be it known that I, ORRIN H. BURDICK, of Auburn, in the county of Cayuga and State of New York, have invented certain new and useful Improvements in Vegetable-Cutters; and I hereby declare that the following is a full, clear, and exact description of the same, reference being had to the accompanying drawings, making a part of this specification, in which—

Figure 1 represents a perspective view of the vegetable-cutter. Fig. 2 represents a horizontal section through its center. Fig. 3 represents a front view of the plate carrying the cutters.

My invention relates to devices for cutting vegetables into thin slices by means of adjustable cutters attached to a rotating plate.

Heretofore the vegetables to be cut with this class of machines have been placed in front of the knives upon a platform and advanced by hand or by a feeding-bar, the cutting-edge of the knives being generally exposed and coming in dangerous proximity with the operator's fingers.

The object of my invention is to remedy these defects, to make a simple implement that can be clamped to a table and operated without danger, and, although it can be sold at a low price, will retain its efficiency for years.

My invention consists in the combination of a cutter-carrying plate having a handle upon one side and a projecting hub upon the other with a circular shield provided with a hollow hub and a clamping device.

It consists, also, in combining, with a revolving plate carrying cutting-blades and the circular shield having attached thereto a cylindrical receptacle for the vegetables, a spring-follower having a serrated surface.

It consists, also, in the combination of all the operating parts forming the device.

In the drawings, A represents the foundation-plate. It is circular in form, and carries near its edge a bracket, A', so bent as to form with the screw $a'$ a clamp, by which the device can be secured to a table or shelf. The plate A is provided at its center with a hollow hub, $a$, for the reception of the spindle $b$ of the cutter-carrying plate B.

To one side of the center of the plate A this plate has a large circular opening through which the vegetables can reach the cutter C. To this opening is fitted the cylinder D, intended to receive the vegetable. This cylinder is securely united to the plate A by swaging it, so as to form a rim or collar on one side of the plate, and flanging the end thereof on the opposite side of the plate A. The opposite end of the cylinder is closed by a plate, $d$, and its top side is cut out at $d'$ for the introduction of vegetables within it.

In the interior of the cylinder D is placed a follower formed of a small cylinder, E, and a plate, $E^1$, nearly fitting the interior of the cylinder. The surface of this plate is provided with pins or serrated projections to keep the vegetables from turning within the cylinder under the action of the knives.

To the outer end of the cylinder E is attached a handle, $E^2$, having a circular flange or shoulder, $e^2$, to abut against the plate $d$ and keep the plate $E^1$ from coming into contact with the cutters. Around the cylinder E is coiled a spiral spring, F, resting at one end against the plate $E^1$ of the follower and at the other against the end $d$ of the cylinder.

To slice a potato or other vegetable the follower is withdrawn toward the end $d$ of the cylinder by the handle $E^2$, the potato is dropped through the opening $d'$ within the cylinder in front of the plate $E^1$, and the handle $E^2$ released, the spiral spring or spring-follower bringing the potato against the cutter-carrying plate B in position for the cutters C to operate in succession upon it. The spindle $b$ of said plate is hollow to receive a bolt, $b^1$, upon which is placed a nut, $b^2$, to secure the hub to its spindle. Thus the only projection upon the front of the plate B is the handle G, by which it is rotated. Each cutter C is secured to the plate B by two screws, $c$, passing through slots in the cutters to allow for the wear or setting thereof. It passes through the plate B at an acute angle and projects upon its interior face a distance equal to the intended thickness of the vegetable slices.

The plate A is all perforated to reduce the weight of metal and to allow air to circulate between it and the plate B and dry them promptly after the device has been used.

The plate A is made circular and larger than the track of the cutters to form a shield and protect the operator from contact with the sharp edges of the cutters.

Having now fully described my invention, I claim—

1. The combination of a cutter-carrying plate having a handle upon one side and a projecting hub upon the other with a circular shield provided with a hollow hub and a clamping device, substantially as and for the purpose described.

2. In combination with a revolving plate carrying cutting-blades and a spring-follower having a serrated surface, the circular shield having attached thereto a cylindrical receptacle, substantially as and for the purpose described.

3. The combination of the circular shield provided with a clamping device, a cylindrical receiver, D, a spring-follower, E E$^1$, and a hollow hub, $a$, with a cutter-carrying plate, B, having a handle upon one side and a hollow projecting hub upon the other, substantially as and for the purpose set forth.

ORRIN H. BURDICK.

Witnesses:
J. FRANK DAVIS,
D. M. KIRBY.